(12) United States Patent
Hasegawa et al.

(10) Patent No.: US 11,135,545 B2
(45) Date of Patent: Oct. 5, 2021

(54) GAS SEPARATION DEVICE

(71) Applicants: JGC Corporation, Yokohama (JP); NGK Insulators, Ltd., Nagoya (JP)

(72) Inventors: Hiroaki Hasegawa, Yokohama (JP); Yasushi Fujimora, Yokohama (JP); Aiko Matsuyama, Yokohama (JP); Shuichi Oguro, Yokohama (JP); Keiichi Nishida, Yokohama (JP); Akiko Fukuta, Yokohama (JP); Kenjii Yajima, Nagoya (JP); Makiko Ichikawa, Nagoya (JP); Takeshi Hagio, Nagoya (JP); Naoko Takahashi, Nagoya (JP); Makoto Miyahara, Nagoya (JP); Katsuya Shimizu, Nagoya (JP)

(73) Assignees: JGC Corporation; NGK Insulators, Ltd.

( * ) Notice: Subject to any disclaimer, the term of this patent is extended or adjusted under 35 U.S.C. 154(b) by 135 days.

(21) Appl. No.: 16/494,807

(22) PCT Filed: May 12, 2017

(86) PCT No.: PCT/JP2017/018020
§ 371 (c)(1),
(2) Date: Sep. 17, 2019

(87) PCT Pub. No.: WO2018/207343
PCT Pub. Date: Nov. 15, 2018

(65) Prior Publication Data
US 2020/0269188 A1    Aug. 27, 2020

(51) Int. Cl.
*B01D 53/22*    (2006.01)
*B01D 65/02*    (2006.01)
*C10L 3/10*    (2006.01)

(52) U.S. Cl.
CPC ........... *B01D 53/227* (2013.01); *B01D 65/02* (2013.01); *C10L 3/104* (2013.01); *C10L 3/105* (2013.01);
(Continued)

(58) Field of Classification Search
None
See application file for complete search history.

(56) References Cited

U.S. PATENT DOCUMENTS

2013/0000484 A1\* 1/2013 Williams ............... B01D 53/22
95/51

FOREIGN PATENT DOCUMENTS

| JP | H0768121 A | 3/1995 |
| JP | 2008073668 A | 4/2008 |

(Continued)

OTHER PUBLICATIONS

English language machine translation for JP 2016-159211. Retrieved from translationportal.epo.org on May 17, 2021. (Year: 2021).\*

(Continued)

*Primary Examiner* — Jason M Greene
(74) *Attorney, Agent, or Firm* — Jordan and Koda, PLLC

(57) ABSTRACT

Provided is a gas separation device configured to separate a non-hydrocarbon gas from a feed gas containing the non-hydrocarbon gas through use of a gas separation membrane, in which a decrease in operating rate can be suppressed, and economic efficiency is satisfactory. A first membrane module (1) and a second membrane module (2) are arranged in parallel to each other with respect to supply lines for a feed gas. Gas lines for regeneration (14, 15) ((24, 25)), which are branched from a permeate gas line (13) ((23)) of the membrane module (1) ((2)), and which are joined to a feed gas line (21) ((11)) configured to supply the feed gas to the membrane module (2) ((1)), are provided. Under a state in (Continued)

which the feed gas is supplied to the membrane module (1), a permeate gas through the membrane module (1) is supplied, as a gas for regeneration, to the membrane module (2) through the gas lines for regeneration (14, 15). In this case, the membrane module (2) is brought into a non-operation state, and the membrane module (2) is regenerated.

3 Claims, 7 Drawing Sheets

(52) U.S. Cl.
CPC .... *B01D 2053/221* (2013.01); *B01D 2321/18* (2013.01); *B01D 2321/40* (2013.01); *C10L 2290/548* (2013.01)

(56) References Cited

FOREIGN PATENT DOCUMENTS

| | | | | | |
|---|---|---|---|---|---|
| JP | 2013-34969 | * | 2/2013 | ............ | B01D 61/36 |
| JP | 2013034969 A | | 2/2013 | | |
| JP | 2016159211 | * | 9/2016 | ............ | B01D 53/22 |
| JP | 2016159211 A | | 9/2016 | | |
| WO | 2016027713 A1 | | 2/2016 | | |

OTHER PUBLICATIONS

English language machine translation of JP 2013-34969. Retrieved from translationportal.epo.org on Jun. 16, 2021. (Year: 2021).*

* cited by examiner

GAS SEPARATION DEVICE

TECHNICAL FIELD

The present invention relates to a technical field for separating a non-hydrocarbon gas from a gas containing the non-hydrocarbon gas through use of a gas separation membrane.

BACKGROUND ART

A natural gas produced from a wellhead contains, as impurities, a relatively large amount of non-hydrocarbon gases, such as a carbon dioxide ($CO_2$) gas and a nitrogen ($N_2$) gas, in some cases. In order to obtain a product gas serving as a raw material for a pipeline gas (utility gas) or a liquefied natural gas, it is required to remove those impurities.

As a procedure of pretreatment for removing the impurities from the natural gas, there has been known a procedure utilizing a gas separation membrane. The gas separation membrane is configured to perform gas separation by using, as a drive energy, a difference in pressure (difference in partial pressure) of a gas to be separated before and after its permeation through the separation membrane, and utilizing a difference in gas permeation speed through the separation membrane. The procedure utilizing the gas separation membrane has advantages in that energy can be saved and handling is easy.

In a gas separation device using the gas separation membrane, it is required that the device be operated under a state in which the gas separation membrane maintains high separation performance, the treatment amount of a gas (flow rate of a natural gas to be subjected to pretreatment) be increased, and the cost in association with the operation also including maintenance be reduced.

In Patent Literature 1, there is described that:
carbon dioxide in a feed gas permeates through a tubular separation membrane made of zeolite, and a gas containing carbon dioxide as a main component flows into a pipe;
a pump is operated at an appropriate time of operation to introduce the gas containing carbon dioxide as a main component into a reservoir tank;
at the time of activation of a membrane module, moisture adhering to the separation membrane is rapidly removed by causing the carbon dioxide in the reservoir tank to permeate through the separation membrane, to thereby recover separation performance; and
when the gas containing carbon dioxide as a main component is not retained in the reservoir tank, the separation membrane is dried through use of carbon dioxide in a carbon dioxide cylinder.

In the technology described in Patent Literature 1, there is no description as to how efficiently the separation performance of the separation membrane having separation performance decreased due to clogging with impurities is recovered.

In Patent Literature 2, there is described a system configured to separate water from an organic aqueous solution through use of two water separation membrane units. As an operation example of the system, there is described that: one of the water separation membrane units is operated to separate water from crude ethanol; and in another water separation membrane unit, a nitrogen gas is supplied from outside of the system through depressuring with a depressuring pump, to thereby push out ethanol accumulated in the water separation membrane, and the nitrogen gas containing the ethanol having been pushed out is sucked with the depressuring pump.

According to the technology described in Patent Literature 2, the nitrogen gas for regeneration is supplied from outside of the system, and hence there is a problem in that economic efficiency is low.

CITATION LIST

Patent Literature

[PTL 1] JP 2016-159211 A
[PTL 2] JP 2013-34969 A

SUMMARY OF INVENTION

Technical Problem

The present invention has been made in view of the above-mentioned circumstances, and an object of the present invention is to provide a gas separation device configured to separate a non-hydrocarbon gas from a feed gas containing the non-hydrocarbon gas through use of a gas separation membrane, in which a decrease in operating rate can be suppressed, and economic efficiency is satisfactory.

Solution to Problem

According to one embodiment of the present invention, there is provided a gas separation device, including:
a plurality of membrane modules connected in parallel to each other, the plurality of membrane modules each including a gas separation membrane configured to reduce a non-hydrocarbon gas in a feed gas containing the non-hydrocarbon gas when the non-hydrocarbon gas is supplied to a primary side through a feed gas line and permeates from the primary side to a secondary side;
permeate gas lines, which are connected to the plurality of membrane modules, and which are each configured to cause a permeate gas to flow out;
non-permeate gas lines, which are connected to the plurality of membrane modules, and which are each configured to cause a non-permeate gas to flow out;
a gas line for regeneration configured to supply, as a gas for regeneration of a second membrane module during non-operation, a permeate gas having permeated through a first membrane module during operation among the plurality of membrane modules to the gas separation membrane of the second membrane module;
a regeneration valve provided in the gas line for regeneration; and
a supply valve provided in the feed gas line connected to each of the primary sides of the plurality of membrane modules,
wherein the second membrane module is regenerated with the gas for regeneration supplied by closing the supply valve of the second membrane module to bring the second membrane module into a non-operation state, and opening the regeneration valve.

Advantageous Effects of Invention

According to the present invention, the permeate gas having permeated through the first membrane module during operation among the plurality of membrane modules connected in parallel to each other is supplied, as the gas for regeneration of the second membrane module during non-operation, to the gas separation membrane of the second membrane module. Thus, the membrane module can be regenerated while the device is operated without supplying the gas for regeneration from outside. That is, according to the present invention, the effects that a decrease in operating rate of the device can be suppressed, and economic efficiency is satisfactory are provided.

DESCRIPTION OF EMBODIMENTS

First Embodiment

Description is given of an embodiment in which a gas separation device of the present invention is applied to the case of separating carbon dioxide ($CO_2$) that is a non-hydrocarbon gas in a natural gas serving as a feed gas. For convenience of description, description is given with "gas" in carbon dioxide gas being omitted. The natural gas contains carbon dioxide. Therefore, in a shipping terminal configured to treat the natural gas to produce a liquefied natural gas, for example, the natural gas is liquefied after a step of separating carbon dioxide in the natural gas. The concentration of carbon dioxide in the natural gas is, for example, from 5 mol % to 80 mol % although depending on a gas field.

Figure 1:
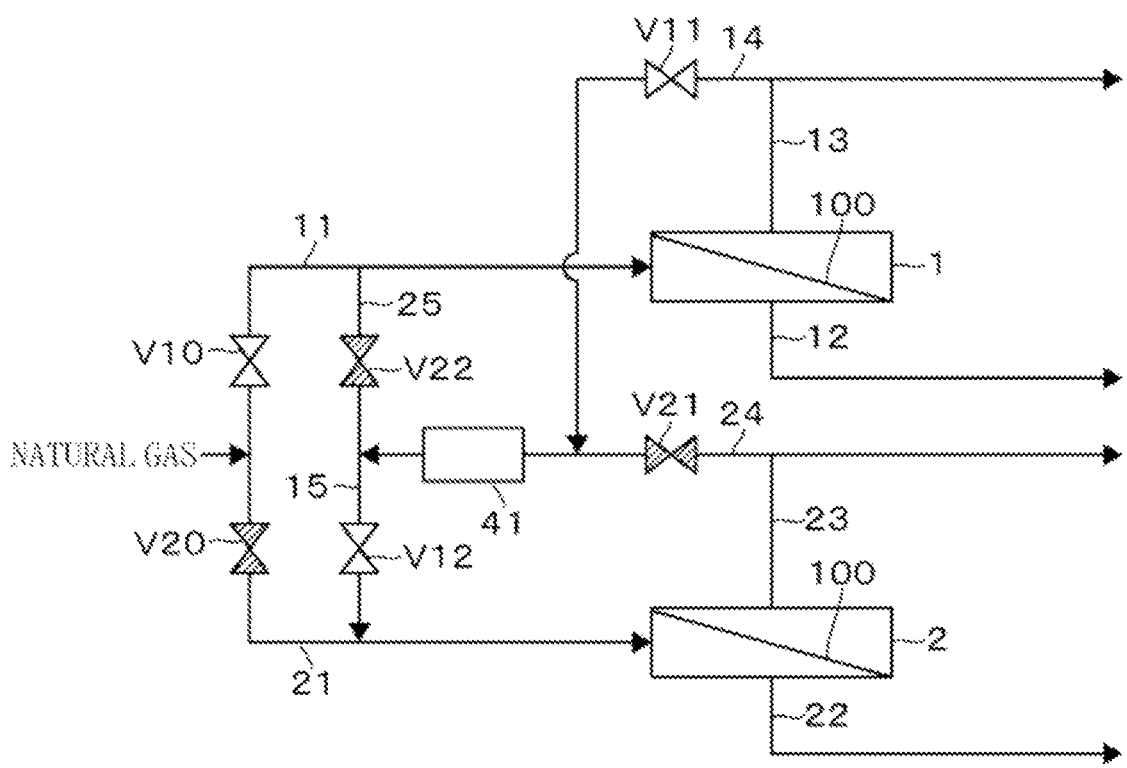
FIG. 1 is a configuration diagram for illustrating a gas separation device according to a first embodiment of the present invention.

FIG. 1 is a diagram for illustrating a gas separation device according to a first embodiment of the present invention. A feed gas line of a natural gas is branched into a first feed gas line 11 and a second feed gas line 21. The first feed gas line 11 and the second feed gas line 21 are connected to an inlet of a first membrane module 1 on a primary side and an inlet of a second membrane module 2 on a primary side, respectively. Valves V10 and V20, which are supply valves, are connected to the first feed gas line 11 and the second feed gas line 21, respectively. That is, the first membrane module 1 and the second membrane module 2 are connected in parallel to each other.

The membrane modules 1 and 2 each have a configuration, for example, in which one or more tubular bodies each having a separation membrane formed therein are arranged in a housing, and carbon dioxide in the natural gas supplied to a region on an outer surface side of the tubular bodies on the primary side permeates through the tubular bodies to flow into an inner surface side of the tubular bodies on a secondary side (gas permeation side). The region on the inner surface side of the tubular body may be set to the primary side, and the region on the outer surface side of the tubular body may be set to the secondary side. As the tubular body, for example, a product including a base material made of porous ceramic or the like and an inorganic film, such as a zeolite film, formed on a surface of the base material is used. In each of the figures, the first membrane module 1 and the second membrane module 2 are schematically illustrated, and the separation membrane is denoted by reference numeral 100.

A non-permeate gas line 12 configured to cause a non-permeate gas, which has not permeated through the separation membrane 100, to flow out is connected to an outlet of the first membrane module 1 on the primary side. A permeate gas line 13 configured to cause a permeate gas, which has permeated through the separation membrane 100, to flow out is connected to an outlet of the first membrane module 1 on the secondary side. The permeate gas line 13 is a gas line directed to outside, and is branched in the middle to be connected to one end side of a branch line 14. A valve V11 is provided in the branch line 14.

Gas lines of the second membrane module 2 are also provided in the same manner as in the gas lines of the first membrane module 1. There are illustrated a non-permeate gas line 22, a permeate gas line 23, a branch line 24, and a valve V21.

Another end side of the branch line 14 and another end side of the branch line 24 are joined to each other to be connected to one end side of a heating unit 41 including, for example, a heat exchanger. A line (connecting line of the branch lines 14 and 24) on another end side of the heating unit 41 is branched into branch lines 15 and 25. The branch line 15 is connected to a downstream side of the supply valve V20 in the second feed gas line 21 (joined to the second feed gas line 21). Thus, it can be said that one end side and another end side of the branch line 15 are connected to the heating unit 41 and the primary side of the second membrane module 2, respectively.

The branch line 25 is connected to a downstream side of the supply valve V10 in the first feed gas line 11. A valve V12 and a valve V22 are connected to the branch lines 15 and 25, respectively.

In this example, a part of the permeate gas line 13, the branch lines 14 and 15, the above-mentioned connecting line, and a part of the feed gas line 21 correspond to a gas line for regeneration configured to supply a gas for regeneration for regenerating the second membrane module 2 to the second membrane module 2. In addition, a part of the permeate gas line 23, the branch lines 24 and 25, the above-mentioned connecting line, and a part of the feed gas line 11 correspond to a gas line for regeneration configured to supply a gas for regeneration for regenerating the first membrane module 1 to the first membrane module 1. Of the gas lines for regeneration, the lines on the one end side of the heating unit 41 and the lines on the other end side thereof correspond to a former-stage gas line and a latter-stage gas line, respectively. The valves V10 and V20 correspond to the supply valves, and the valves V11, V12, V21, and V22 correspond to regeneration valves.

In addition, although not shown, the gas separation device includes a control unit configured to output a control signal for operating the above-mentioned valves.

Next, the action of the above-mentioned embodiment is described. For example, a state in which the valve V10 is opened and the valve V20 is closed is considered. A natural gas having moisture removed therefrom by pretreatment is supplied to the primary side of the first membrane module 1 and is not supplied to the second membrane module 2. Therefore, the first membrane module 1 is brought into an operation state, and the second membrane module 2 is brought into a non-operation state. In this case, the valves V11 and V12 of are opened and the valves V21 and V22 are closed in the gas lines for regeneration. In the figures, the state in which a valve is opened is indicated by a white blank portion, and the state in which a valve is closed is indicated by a shaded portion.

The separation membrane 100 is configured to separate carbon dioxide from the natural gas by using, as a drive energy, a difference in partial pressure of carbon dioxide between the primary side and the secondary side. For example, through regulation of pressure control valves (not shown) provided in the permeate gas lines 13 and 23 (on an upstream side or a downstream side with respect to branching points with the branch lines 14 and 24), the difference in partial pressure is set to a predetermined value. Thus, carbon dioxide in the natural gas supplied to the primary side of the first membrane module 1 during operation permeates through the separation membrane 100 and flows out to the permeate gas line 13 as a permeate gas. Meanwhile, the natural gas having a concentration of carbon dioxide reduced, which is a non-permeate gas that has not permeated through the separation membrane 100, flows out to the non-permeate gas line 12.

Carbon dioxide (correctly, a gas containing carbon dioxide as a main component), which is the permeate gas through the first membrane module 1, is fed to outside of the gas separation device, and part of the permeate gas is supplied, as the gas for regeneration, to the primary side of the second membrane module 2 in a non-operation state through the branch line 14, the heating unit 41, the branch line 15, and the second feed gas line 21. The heating unit 41 is configured so as to set carbon dioxide to a temperature of, for example, from 60° C. to 300° C.

Now, the membrane module to be used in the present invention is described. In the membrane module used in the present invention, a permeability (permeation performance) decreases as an operation time is prolonged. In other words, when S0 represents an area (effective area) of a membrane of a new membrane module, and St represents an area of the membrane for setting the flow rate of a permeate gas at a time when a certain operation time has elapsed to be the same as the flow rate of the permeate gas at the time of an initial stage of the new membrane module, a value of St/S0 increases as the operation time is prolonged.

The inventors of the present invention have figured out that, for example, through circulation of an inert gas from a primary side to a secondary side in a membrane module having a permeability decreased, the permeability of the membrane module is restored to a permeability at the time of initial operation, that is, the membrane module can be regenerated. Also through use of a normal-temperature inert gas as a gas for regeneration, the membrane module can be regenerated, but the inventors have also figured out that a time period required for regeneration is shortened by heating the inert gas. As an example, when an inert gas heated to, for example, 150° C. is used, the permeation performance of the membrane module is restored in 9 hours.

The inventors of the present invention presume that a decrease in permeation performance of the membrane module is caused by an increase in adsorption amount of impurities (mainly hydrocarbons) adhering to fine pores of zeolite forming the separation membrane. Therefore, it is conceivable that, for example, heat is given to the separation membrane by heating carbon dioxide to accelerate the molecular movement of the impurities, and the impurities flying out from the fine pores can be removed from the separation membrane by being carried on a gas stream of carbon dioxide.

For example, even when normal-temperature carbon dioxide is used, the impurities are carried on a gas stream of carbon dioxide. However, a time period required for sufficiently removing the impurities becomes longer than that in the case of heating the separation membrane. Therefore, it is advantageous to heat carbon dioxide. As a method of heating the separation membrane, the separation membrane may be directly heated. As a method of directly heating the separation membrane, a heater may be provided in a housing forming the membrane module to transfer heat from the housing to the separation membrane, or an infrared lamp may be provided in the housing to heat the separation membrane with radiation heat. The direct heating of the separation membrane and the heating of carbon dioxide with the heating unit 41 may be used together.

Returning to FIG. 1, when the gas for regeneration is supplied to the primary side of the second membrane module 2, carbon dioxide permeates to the secondary side in an amount corresponding to a difference between the pressure of carbon dioxide on the primary side and the pressure of carbon dioxide on the secondary side in the separation membrane 100 of the second membrane module 2, and flows out of the gas separation device through the permeate gas line 23. In addition, the non-permeate gas that has not permeated through the separation membrane 100 flows out of the gas separation device through the non-permeate gas line 22.

The difference in pressure between the primary side and the secondary side in the second membrane module 2 is set to a predetermined value, for example, by regulating a pressure control valve (not shown) provided in the branch line 14 on a first membrane module 1 side, which is part of the gas line for regeneration. The pressure regulation by the pressure control valve is performed in consideration of a pressure loss at the time when the gas for regeneration passes through the heating unit 41 and the second membrane module 2.

The second membrane module 2 is regenerated as described above. For example, after the regeneration is performed for 9 hours, the second membrane module 2 is operated, and the first membrane module 1 is brought into a non-operation state.

That is, the valve V10 is closed, and the valve V20 is opened. Then, the valves V11 and V12 are closed and the valves V21 and V22 are opened in the gas lines for regeneration. Carbon dioxide in the natural gas supplied to the primary side of the second membrane module 2 during operation permeates through the separation membrane 100 and flows out to the permeate gas line 23 as the permeate gas. The non-permeate gas that has not permeated through the separation membrane 100 flows out to the non-permeate gas line 22.

Carbon dioxide that is the permeate gas through the second membrane module 2 is fed to a downstream side of the gas separation device, and part of the permeate gas is supplied as, a gas for regeneration, to the primary side of the first membrane module 1 in a non-operation state through the branch line 24, the heating unit 41, the branch line 25, and the first feed gas line 11. After the first membrane module 1 is regenerated as described above for a predetermined time period, each of the valves is opened or closed so as to achieve the state of FIG. 1, and the second membrane module 2 is regenerated. One of the first membrane module 1 and the second membrane module 2 is brought into an operation state, and the other thereof is brought into a non-operation state. Thus, the first membrane module 1 and the second membrane module 2 are alternately regenerated.

In this example, as a time period for regenerating the membrane module 1 (2), 9 hours are given. However, the regeneration may be performed for, for example, 2 hours depending on the operation of the system and the like, and it is preferred that the regeneration be performed for, for example, 6 hours or more. The time period for performing regeneration refers to a time period for supplying the gas for regeneration to the separation module 1 (2). In the above-mentioned example, the time period for performing regeneration refers to a time period from a time of establishment of the state in which the valves V10, V11, and V12 are opened and the valves V20, V21, and V22 are closed to a time of establishment of the state in which the valves V20, V21, and V22 are opened and the valves V10, V11, and V12 are closed. Thus, the time period for performing regeneration can also be regarded as a time period from the end of operation of a valve for regeneration to the end of operation of a valve for restoration (operation) to an operation line with respect to the membrane module to be regenerated.

According to the above-mentioned embodiment, the permeate gas having permeated through one membrane module 1 (2) during operation among the first membrane module 1 and the second membrane module 2 connected in parallel to each other is supplied, as the gas for regeneration of the other membrane module 2 (1) during non-operation, to the primary side of the gas separation membrane 100 of the other membrane module 2 (1). Thus, the membrane module 2 (1) can be regenerated while the device is operated without supplying the gas for regeneration from outside. Therefore, the effects that a decrease in operating rate of the device can be suppressed, and economic efficiency is satisfactory are provided.

Meanwhile, in consideration of the operating rate, the separation performance improving rate by membrane regeneration, and the like, long-term regeneration leads to degradation in economic efficiency. Therefore, it is preferred that the regeneration time be set to, for example, 60 hours or less.

The gas for regeneration for regenerating the first membrane module 1 and the gas for regeneration for regenerating the second membrane module 2 are heated with the common heating unit 41. Therefore, the device configuration is simplified, which contributes to a reduction in cost.

Figure 2:
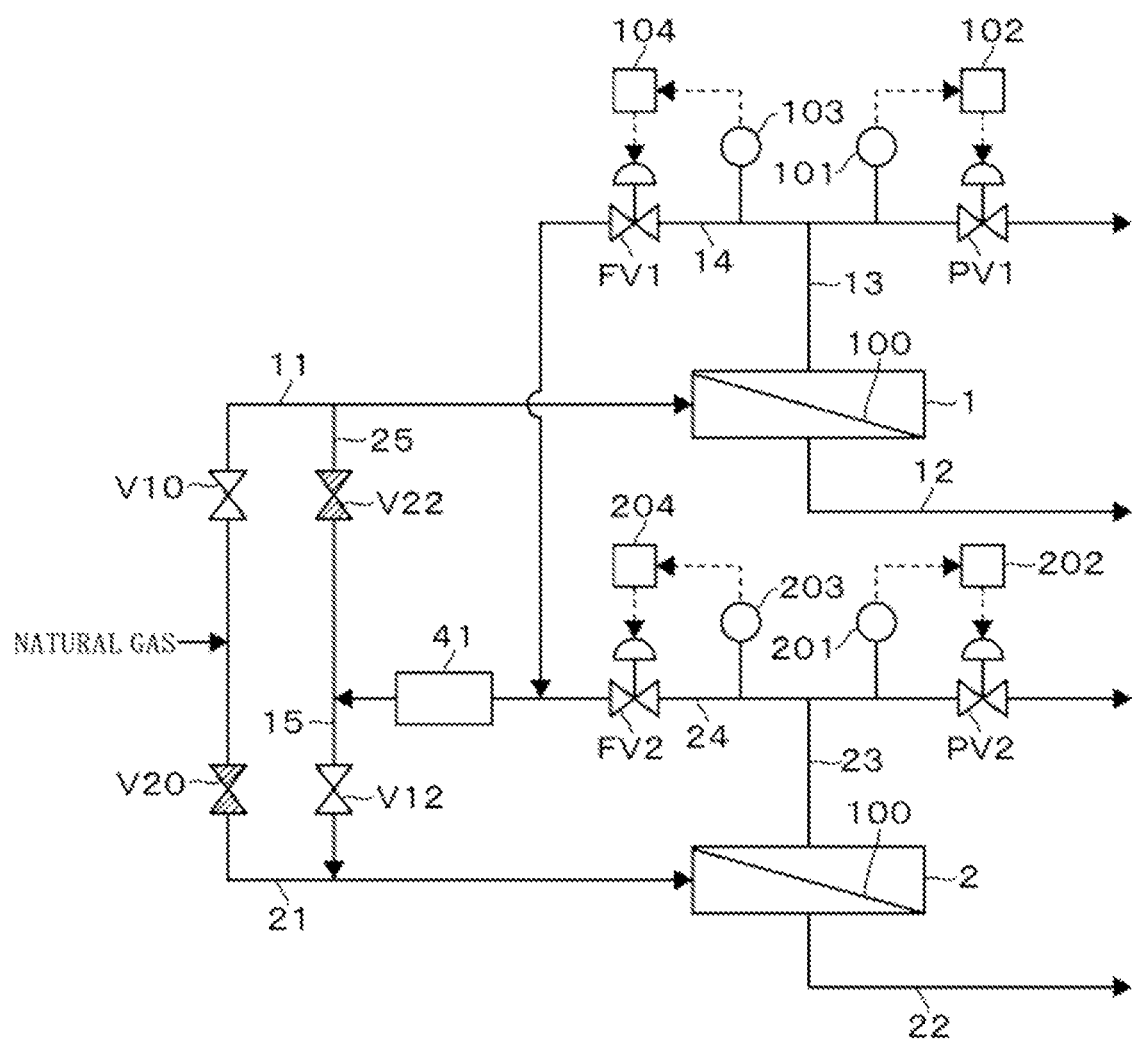
FIG. 2 is a configuration diagram for illustrating a modified example of the gas separation device according to the first embodiment of the present invention.

The above-mentioned first embodiment may be implemented, for example, as illustrated in FIG. 2. In an example illustrated in FIG. 2, pressure control valves PV1 and PV2 and pressure detecting units 101 and 201 are provided in the permeate gas lines 13 and 23, respectively. The pressure control valves PV1 and PV2 may be arranged in any one of regions on an upstream side and a downstream side with respect to branching points of the permeate gas lines 13 and 23 with the branch lines 14 and 24. In this example, the pressure control valves PV1 and PV2 are arranged on the downstream side of the branching points. There are illustrated controllers 102 and 202. The controllers 102 and 202 are configured to control the pressures of the permeate gas lines 13 and 23 by adjusting opening degrees of the pressure control valves PV1 and PV2 based on pressure detection values of the pressure detecting units 101 and 201.

In addition, flow rate control valves FV1 and FV2 and flow rate detecting units 103 and 203 are provided in the branch lines 14 and 24, respectively. There are illustrated controllers 104 and 204. The controllers 104 and 204 are configured to control the flow rates of the branch lines 14 and 24 by adjusting opening degrees of the flow rate control valves FV1 and FV2 based on flow rate detection values of the flow rate detecting units 103 and 203.

In this example, for example, when the gas for regeneration is supplied from the first membrane module 1 to the second membrane module 2, the flow rate adjusting valve FV2 on a second membrane module 2 side is closed. Then, the pressure of the permeate gas line 13 is controlled to be a set pressure by the pressure control valve PV1, and the flow rate of the gas for regeneration flowing through the branch line 14 is controlled to be a set flow rate by the flow rate control valve FV1. In this case, the pressure control valve PV2 on the second membrane module 2 side is fully opened, and pressure control is not performed therein.

Also when the gas for regeneration is supplied from the second membrane module 2 to the first membrane module 1, control is performed in the same manner through use of the pressure control valve PV2 and the flow rate control valve FV2.

Second Embodiment

Figure 3:
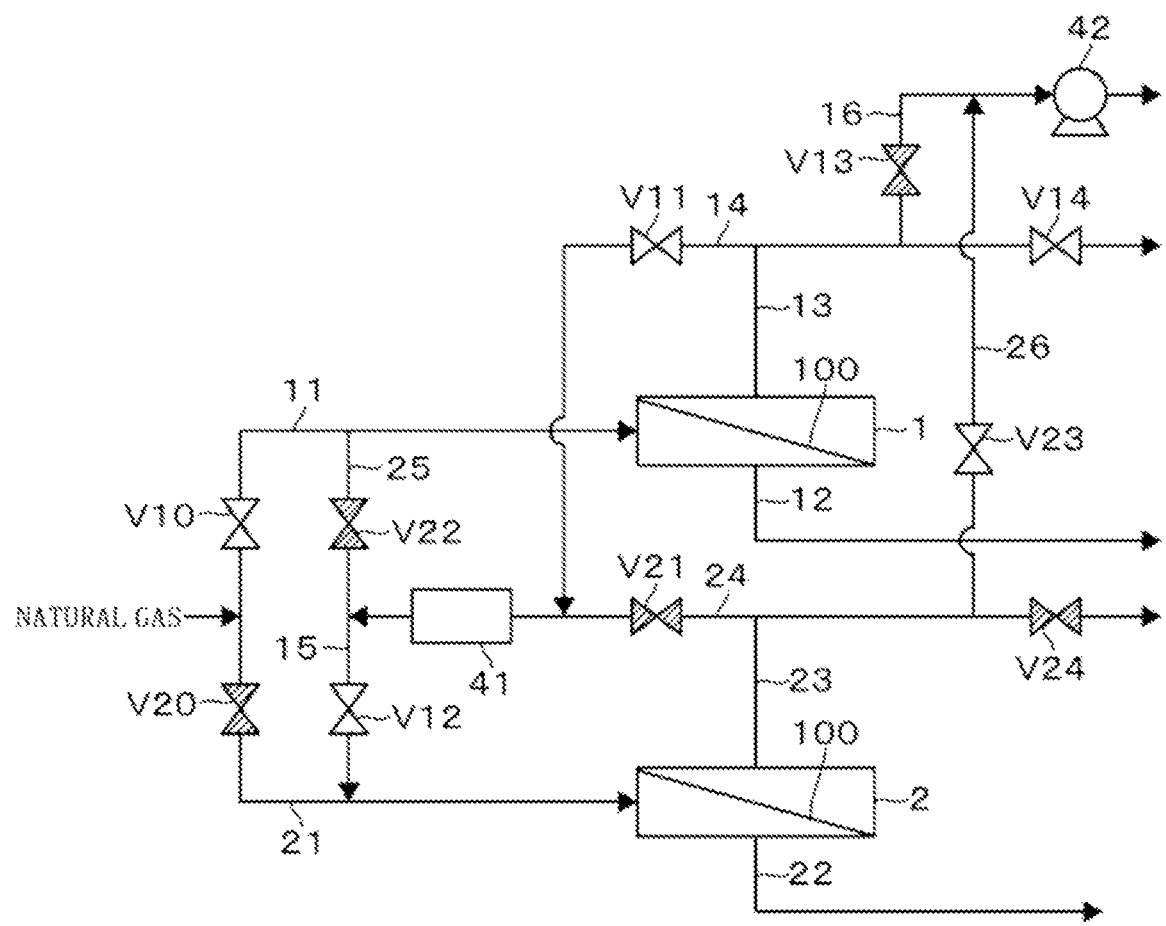
FIG. 3 is a configuration diagram for illustrating a gas separation device according to a second embodiment of the present invention.

FIG. 3 is a diagram for illustrating a second embodiment of the present invention. Configurations different from those of the first embodiment are as follows.

a) One end sides of depressuring lines 16 and 26 are connected to the permeate gas lines 13 and 23, respectively.

b) Other end sides of the depressuring lines 16 and 26 are joined to each other, and a depressuring pump 42 that is a depressuring mechanism is provided in a connecting line.

c) Valves V13 and V23 are provided in the depressuring lines 16 and 26, respectively.

d) In the permeate gas lines 13 and 23, valves V14 and V24 are provided on a downstream side with respect to branching points with the depressuring lines 16 and 26, respectively.

e) A difference in pressure between the primary side and the secondary side of the membrane module 2 (1) that is being regenerated is caused by vacuuming with the depressuring pump 42.

FIG. 3 is a diagram for illustrating a state in which, under the condition that the first membrane module 1 is brought into an operation state, and the second membrane module 2 is brought into a non-operation state, the second membrane module 2 is regenerated through use of the permeate gas through the first membrane module 1 as the gas for regeneration. In this case, the valves V13 and V14 are "closed" and "opened", respectively, and the valves V23 and V24 are "opened" and "closed", respectively.

Therefore, the permeate gas through the first membrane module 1 is used as the gas for regeneration and flows out of the device through the valve V14. In addition, the permeate gas through the second membrane module 2 is sucked with the depressuring pump 42 through the depressuring line 26. The pressure of the depressuring line 26 may be regulated through arrangement of a pressure adjusting valve on the primary side of the depressuring pump 42.

In this example, the pressure in the second membrane module 2 is low. Therefore, when the separation membrane 100 of the second membrane module is heated with heated carbon dioxide, a heat conductivity is unsatisfactory. Therefore, the heat of carbon dioxide may be transferred to the separation membrane 100 by stopping the depressuring pump 42 or closing the valve V23 of the depressuring line 26 and opening the valve V24 of the permeate gas line 23, to thereby increase the pressure in the second membrane module 2. In this case, after the separation membrane 100 is sufficiently heated, the secondary side of the second membrane module 2 is vacuumized with the depressuring pump 42.

In addition, as a method of heating the separation membrane 100 of the second membrane module, a method involving directly heating the second membrane module 100 as described above may be adopted.

After the second membrane module 2 is regenerated for a predetermined time period, the "opened" or "closed" state of each of the valves is reversed to bring the first membrane module 1 into anon-operation state, and the first membrane module 1 is regenerated with the permeate gas having permeated through the second membrane module 2 brought into an operation state.

Third Embodiment

A third embodiment of the present invention is an example in which the gas for regeneration is supplied to an outlet of the membrane module 2 (1) on the primary side. Regarding the description of configurations, in order to avoid repetition of the same description of the configurations, reference symbols of portions corresponding to those denoted by reference symbols are put in parentheses in addition to the portions denoted by reference symbols, and thus the portions denoted by reference symbols without parentheses and the portions denoted by reference symbols in parentheses are simultaneously described.

Figure 4:
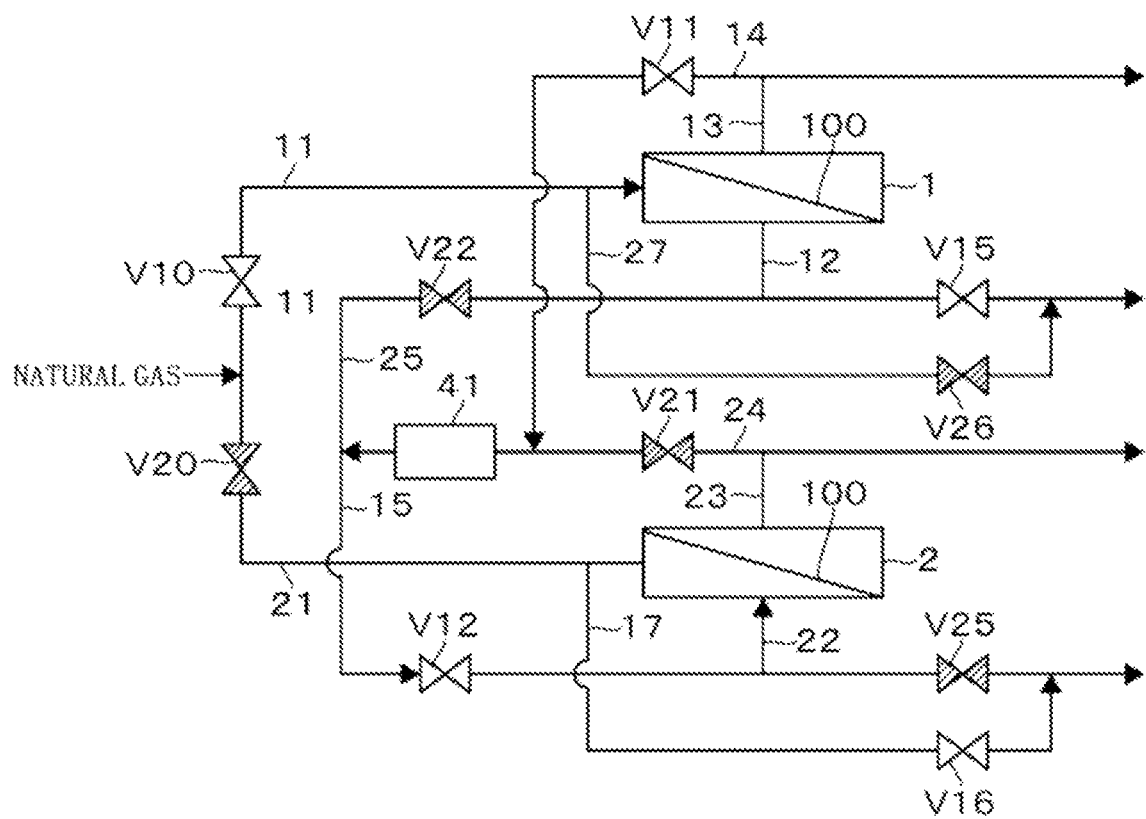
FIG. 4 is a configuration diagram for illustrating a gas separation device according to a third embodiment of the present invention.

As illustrated in FIG. 4, a supply destination of the gas for regeneration from the first membrane module 1 (2), that is, the other end side of the branch line 15 (25) that is the gas line for regeneration is joined to the non-permeate gas line 22 (12) connected to an outlet side of the primary side of the second membrane module 2 (1). A valve V25 (V15) is provided on a downstream side with respect to a connecting position in the non-permeate gas line 22 (12). Further, in the feed gas line 21 (11) of the second membrane module 2 (1), a outlet line for regeneration 17 (27) is branched from a downstream side of the valve V20 (V10), and the downstream side of the outlet line for regeneration 17 (27) is joined to a downstream side of the valve V25 (V15) in the non-permeate gas line 22 through a valve V16 (V26).

FIG. 4 is a diagram for illustrating a state in which the first membrane module 1 is in an operation state, and the permeate gas through the first membrane module 1 is supplied, as the gas for regeneration, to the outlet of the second membrane module 2 in a non-operation state on the primary side. Carbon dioxide that is the gas for regeneration supplied to the second membrane module 2 from the outlet on the primary side permeates to the secondary side in the same manner as in the first embodiment, and carbon dioxide that has not permeated to the secondary side flows out of the device through the outlet line for regeneration 17, the valve V16, and the non-permeate gas line 22.

After the regeneration of the second membrane module 2 is finished, the "opened" or "closed" state of each of the valves is reversed to bring the second membrane module 2 into an operation state, and the first membrane module 1 is regenerated.

Fourth Embodiment

Figure 5:
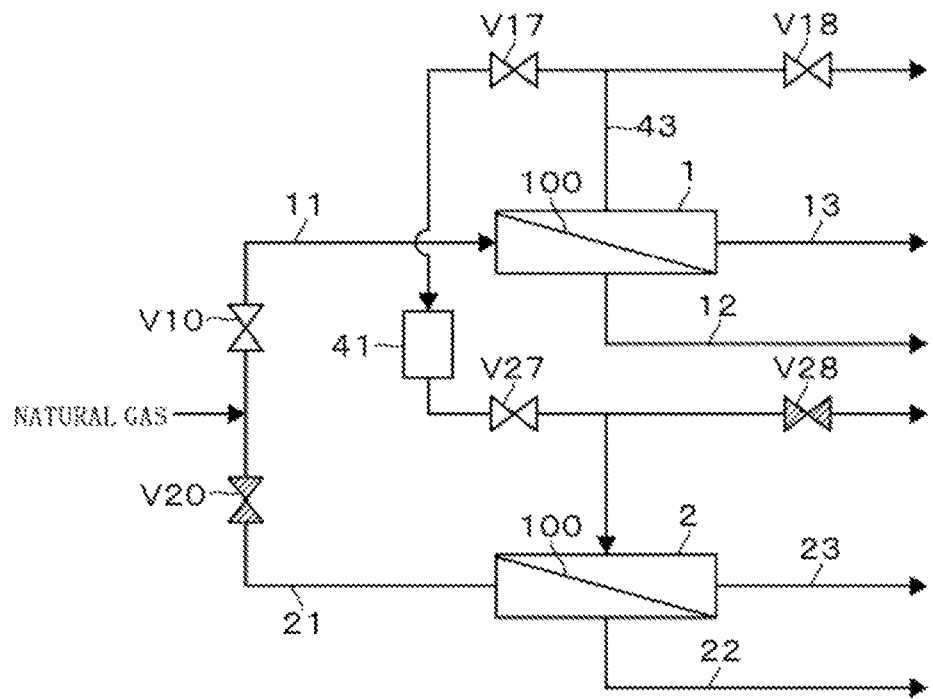
FIG. 5 is a configuration diagram for illustrating a gas separation device according to a fourth embodiment of the present invention.

A fourth embodiment of the present invention is an example in which the gas for regeneration is supplied to the secondary side of the membrane module 2 (1) as illustrated in FIG. 5. The secondary sides of the first membrane module 1 and the second membrane module 2 are connected to each other through a gas line for regeneration 43. In the gas line for regeneration 43, valves V17 and V27 that are regeneration valves are provided, and the heating unit 41 is provided between the valves V17 and V27.

One end side of the gas line for regeneration 43 is connected to a connection port different from a connection port of the permeate gas line 13 on the secondary side of the first membrane module 1. Another end side of the gas line for regeneration 43 is connected to a connection port different from a connection port of the permeate gas line 23 on the secondary side of the second membrane module 2.

In addition, in the gas line for regeneration 43, a branch line 431 is branched from a portion between the first membrane module 1 and the valve V17, and a branch line 432 is branched from a portion between the second membrane module 2 and the valve V27. Valves V18 and V28 are provided in the branch lines 431 and 432, respectively.

FIG. 5 is a diagram for illustrating a state in which the first membrane module 1 and the second membrane module 2 are in an operation state and in a non-operation state, respectively, and the second membrane module 2 is regenerated. Through opening of the valves V17 and V27, the permeate gas (carbon dioxide) through the first membrane module 1 flows into the secondary side of the second membrane module 2 as the gas for regeneration, and flows out to the primary side after permeating through the separation membrane 100. In this case, the valve 18 is opened, and the valve 28 is closed. Part of the gas for regeneration flows out of the permeate gas line 23.

After the regeneration of the second membrane module 2 is finished, the valve V10 is closed, and the valve V20 is opened. At the same time, the valve V18 is closed, and the valve V28 is opened. With this, the first membrane module 1 is regenerated. Through closing of the valves V17 and V27, the membrane modules 1 and 2 may also be brought into an operation state simultaneously.

Also when the gas for regeneration is caused to permeate through the membrane module from the secondary side to the primary side, the membrane module can be regenerated.

In this case, as described as the second embodiment (see FIG. 3), a depressuring mechanism may be provided so as to decompress a gas line through which the gas for regeneration flows after permeating through the membrane module. The gas line through which the gas for regeneration flows after permeating through the membrane module corresponds to the permeate gas lines 13 and 23 that are the gas lines on the secondary sides of the membrane modules in the example of FIG. 3, and corresponds to the non-permeate gas lines 12 and 22 that are the gas lines on the primary side thereof in the example of FIG. 5.

Fifth Embodiment

Figure 6:
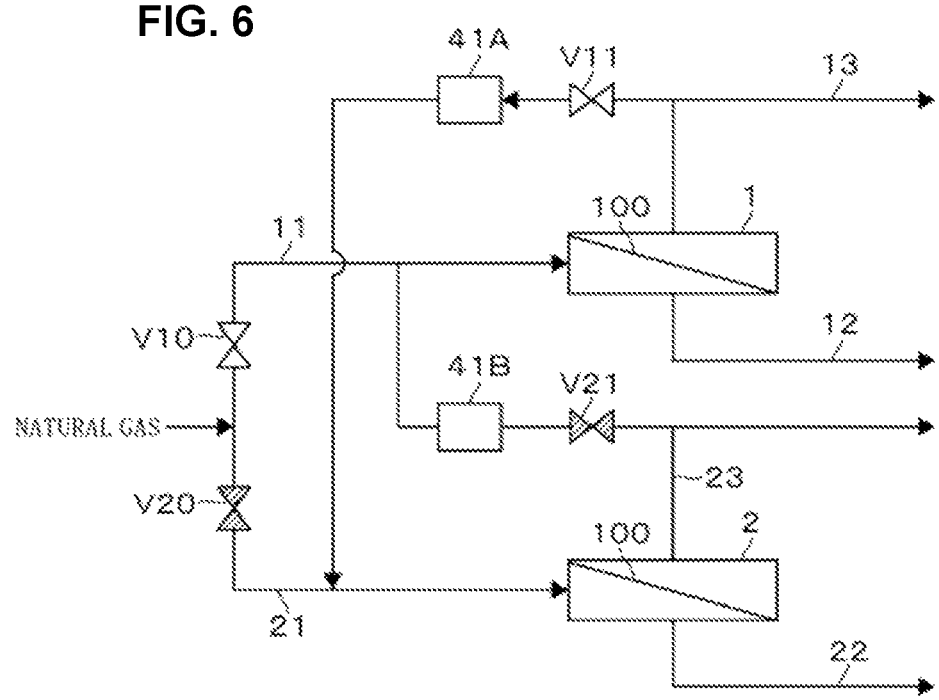
FIG. 6 is a configuration diagram for illustrating a gas separation device according to a fifth embodiment of the present invention.

In a fifth embodiment of the present invention, as illustrated in FIG. 6, the other end sides of the branch lines 14 and 24 that are the gas lines for regeneration are connected to the feed gas lines 21 and 22 through heating units 41A and 41B, respectively, without being joined to each other. The above-mentioned first embodiment is more advantageous than the fifth embodiment in that the gas for regeneration for regenerating the second membrane module 2 and the gas for regeneration for regenerating the first membrane module 1 are heated by the common heating unit 41. However, the effects of the present invention are obtained also in the fifth embodiment.

Sixth Embodiment

Figure 7:
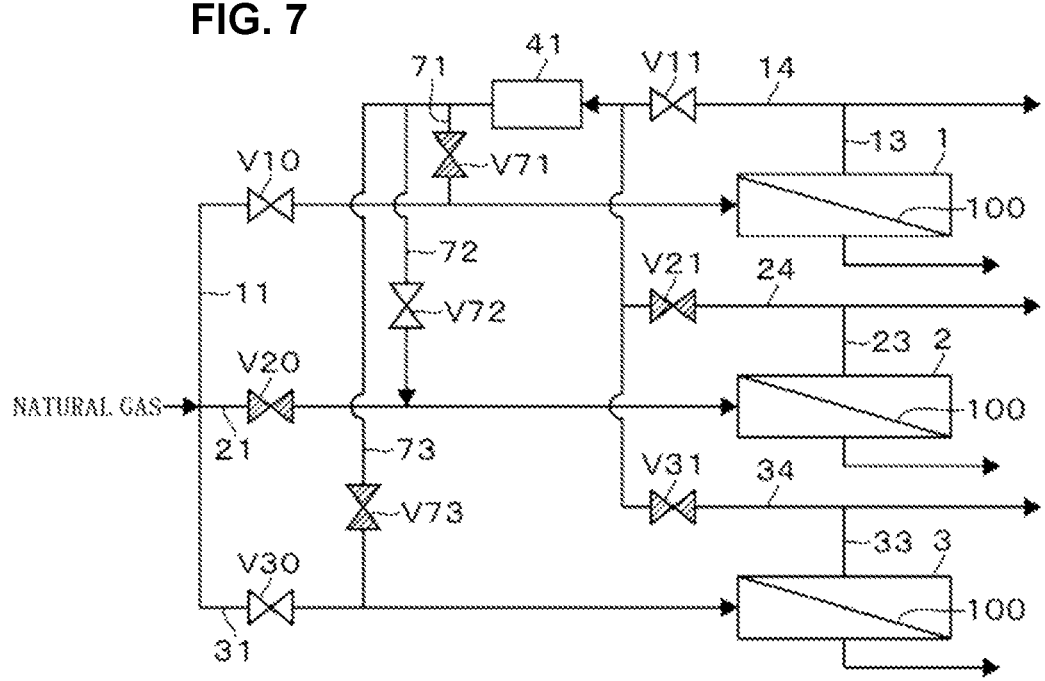
FIG. 7 is a configuration diagram for illustrating a gas separation device according to a sixth embodiment of the present invention.
Figure 8:
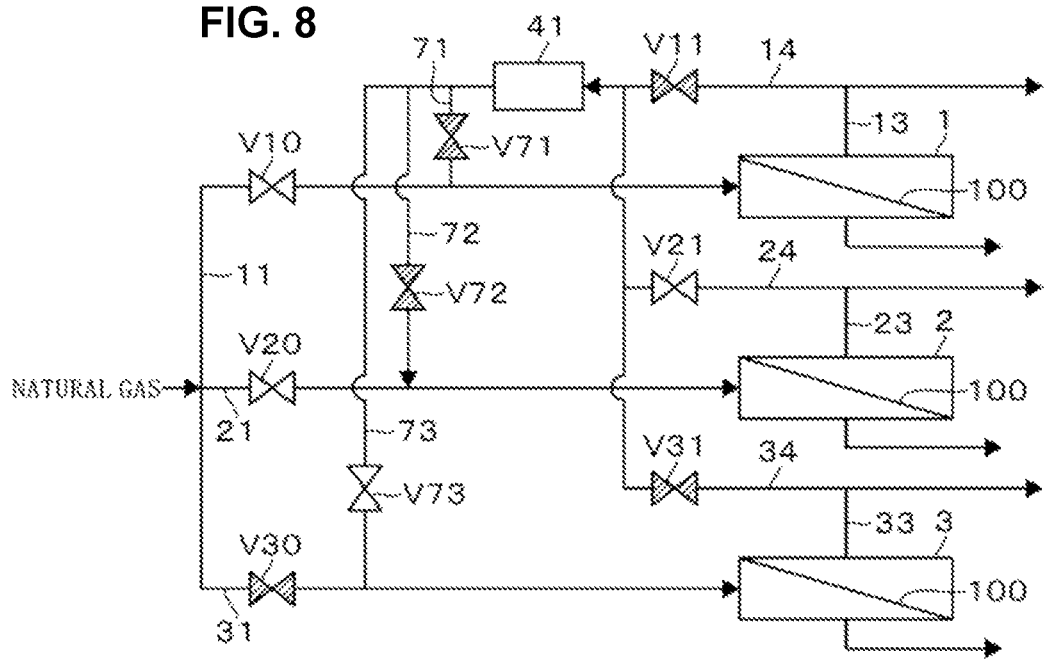
FIG. 8 is a configuration diagram for illustrating the gas separation device according to the sixth embodiment of the present invention.
Figure 9:
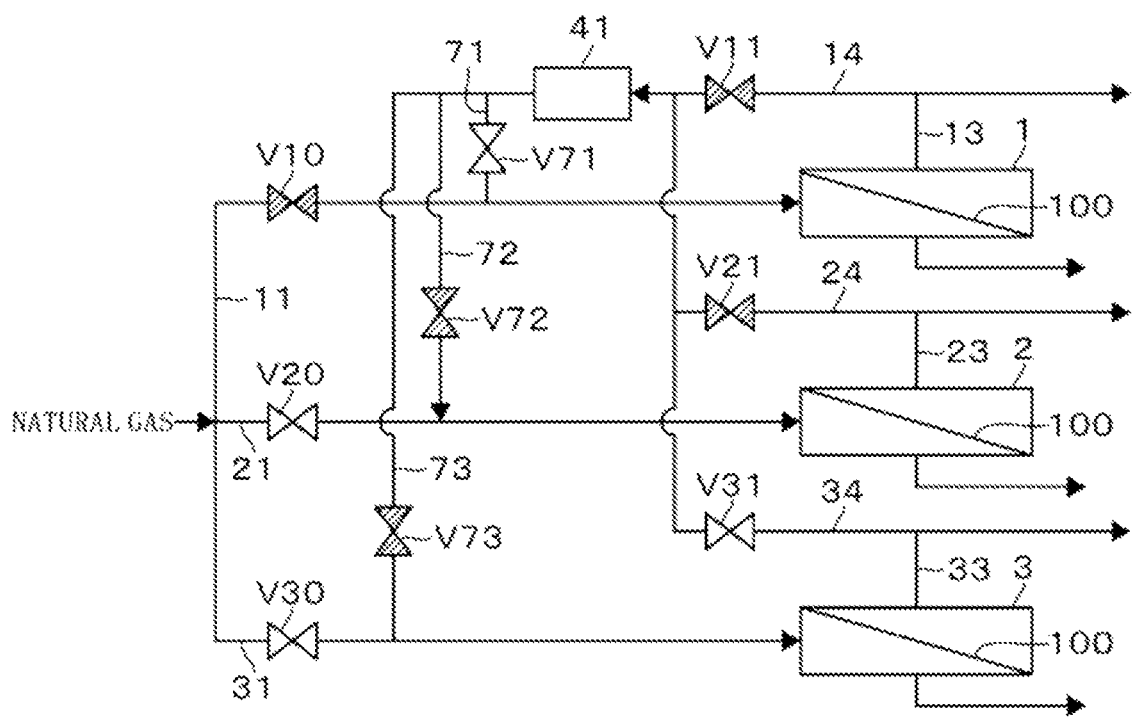
FIG. 9 is a configuration diagram for illustrating the gas separation device according to the sixth embodiment of the present invention.

In the first embodiment to the fifth embodiment, the first membrane module 1 and the second membrane module 2 are alternately brought into an operation state. However, in the present invention, three or more membrane modules may be used, and those membrane modules may be brought into a non-operation state and regenerated in sequence, for example. A sixth embodiment of the present invention, which is one of such examples, is illustrated in FIG. 7 to FIG. 9. In the sixth embodiment, a third membrane module 3 is used in addition to the first membrane module 1 and the second membrane module 2.

In FIG. 7, portions corresponding to those in FIG. 1 are denoted by the same reference symbols as those used in FIG. 1. There are illustrated a feed gas line 31, a gas supply valve V30, a non-permeate gas line 32, a permeate gas line 33, a branch line 34, and a valve V31. The branch line 34 branched from the permeate gas line 33 of the third membrane module 3 is joined to branch lines 14 and 24, and these branch lines are branched into branch lines 71, 72, and 73 on a downstream side of a connecting line. The heating unit 41 is provided in the connecting line. End portions of the branch lines 71, 72, and 73 on an opposite side to a branching point are connected to a downstream side of the gas supply valves V10, V20, and V30 in the feed gas lines 11, 21, and 31, respectively.

FIG. 7 is a diagram for illustrating a state in which the first membrane module 1 and the third membrane module 3 are brought into an operation state, the second membrane module 2 is brought into a non-operation state, and the gas for regeneration is supplied from the first membrane module 1 to the second membrane module 2 to regenerate the second membrane module 2.

FIG. 8 is a diagram for illustrating a state in which the first membrane module 1 and the second membrane module 2 are brought into an operation state, the third membrane module 3 is brought into a non-operation state, and the gas for regeneration is supplied from the second membrane module 2 to the third membrane module 3 to regenerate the third membrane module 3.

FIG. 9 is a diagram for illustrating a state in which the second membrane module 2 and the third membrane module 3 are brought into an operation state, the first membrane module 1 is brought into a non-operation state, and the gas for regeneration is supplied from the third membrane module 3 to the first membrane module 1 to regenerate the first membrane module 2.

The third embodiment is not limited to such operation. For example, after the regeneration of the second membrane module 2 in the state illustrated in FIG. 7 is finished, the third membrane module 3 may be regenerated through use of the permeate gas through the first membrane module 1.

In the first embodiment to the sixth embodiment described above, there is illustrated the configuration in which the first membrane module 1 and the second membrane module 2 are connected in parallel to each other. However, in a manufacturing system of LNG, a plurality of membrane modules are connected in series to each other, that is, the plurality of membrane modules are successively connected so that a permeate gas line of a membrane module in a former stage forms a feed gas line of a membrane module in a latter stage in many cases. In this case, a plurality of groups of the plurality of membrane modules connected in series to each other are connected in parallel to each other. Needless to say, the present invention can also be applied to such configuration.

The feed gas used in the present invention is not limited to a natural gas and may be a biogas. In addition, the permeate gas is not limited to carbon dioxide and may be nitrogen. Thus, the feed gas may be a gas containing nitrogen.

The invention claimed is:

1. A gas separation device, comprising:
a plurality of membrane modules connected in parallel to each other, the plurality of membrane modules each including a gas separation membrane configured to reduce a non-hydrocarbon gas in a feed gas containing the non-hydrocarbon gas when the non-hydrocarbon gas is supplied to a primary side through a feed gas line and permeates from the primary side to a secondary side;
permeate gas lines, which are connected to the plurality of membrane modules, and which are each configured to cause a permeate gas to flow out;
non-permeate gas lines, which are connected to the plurality of membrane modules, and which are each configured to cause a non-permeate gas to flow out;
a gas line for regeneration configured to supply, as a gas for regeneration of a second membrane module during non-operation, a permeate gas having permeated through a first membrane module during operation among the plurality of membrane modules to the gas separation membrane of the second membrane module through the primary side of the second membrane module;
a regeneration valve provided in the gas line for regeneration;
a supply valve provided in the feed gas line connected to each of the primary sides of the plurality of membrane modules; and
a control unit configured to output a control signal so that the supply valve of the second membrane module is closed and the regeneration valve is opened in order to perform regeneration of the second membrane module with the gas for regeneration supplied by closing the supply valve of the second membrane module to bring the second membrane module into a non-operation state, and opening the regeneration valve,
wherein the gas line for regeneration includes:
a former-stage gas line having one end side connected to the secondary side of each of the plurality of membrane modules and another end side connected to one end side of a common heating unit; and
a latter-stage gas line having one end side connected to another end side of the heating unit and another end side branched to be connected to the primary side of each of the plurality of membrane modules, and
wherein the regeneration valve is provided in each of the former-stage gas line and the branched latter-stage gas line.

2. The gas separation device according to claim 1, further comprising a depressuring mechanism configured to decompress a gas line on the secondary side of the second membrane module that is being regenerated.

3. The gas separation device according to claim 1, wherein the regeneration of the another membrane module during non-operation takes two or more hours from a start to an end.

* * * * *